United States Patent [19]
Sado

[11] 3,975,000
[45] Aug. 17, 1976

[54] PREFABRICATED BALUSTRADE WITH MEANS FOR CONNECTION OF BALUSTERS TO A RAIL

[75] Inventor: Yukio Sado, Asahimachi, Japan

[73] Assignee: Yoshida Kogyo Kabushiki Kaisha, Japan

[22] Filed: Oct. 11, 1974

[21] Appl. No.: 514,136

[30] Foreign Application Priority Data
Oct. 12, 1973   Japan.................. 48-119150[U]

[52] U.S. Cl.................................. 256/59; 52/627; 403/263; 312/140
[51] Int. Cl.² ..................... B01F 13/00; B25G 3/00
[58] Field of Search ............. 256/47, 24, 22, 59, 256/21, 65; 52/627; 403/253, 263, 315, 353; 312/140

[56] References Cited
UNITED STATES PATENTS
1,791,680   2/1931   Miller............................ 256/21 UX
3,482,819   12/1969   Leurent................................ 256/59

Primary Examiner—Paul R. Gilliam
Attorney, Agent, or Firm—Bucknam and Archer

[57] ABSTRACT

A balustrade having a series of balusters connected to both top and bottom rails or, if desired, to a top rail only is disclosed which can be completed by assembling standardized parts. The top and bottom rails each includes a horizontal baluster mounting plate facing inwardly, and this mounting plate has an aperture extending along one of the longitudinal edges thereof and a series of longitudinally spaced recesses open to the aperture. The end portions of the balusters are inserted into the respective recesses of the mounting plate, either directly or via the aperture. Means are provided in several forms of construction for locking the baluster end portions within the recesses. The aperture can be closed by a separate filler plate, which is adaptable either to snap into position in the aperture or to slide longitudinally therein.

11 Claims, 11 Drawing Figures

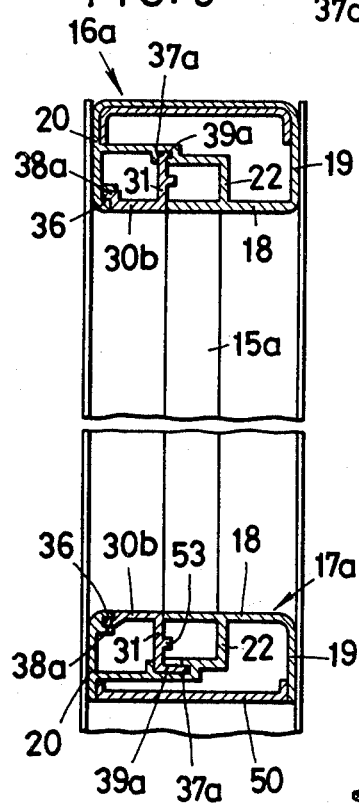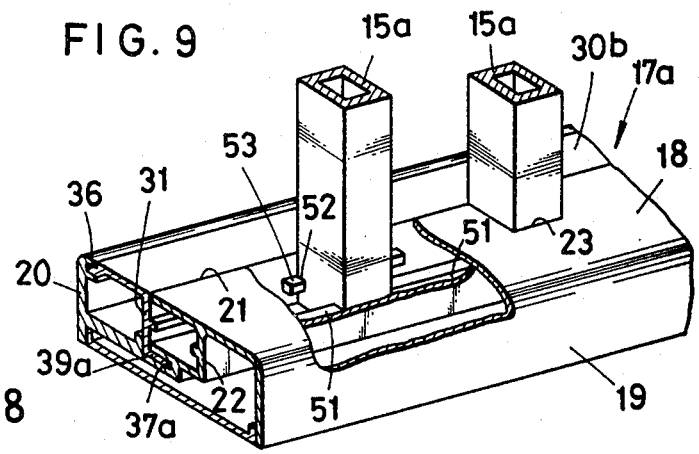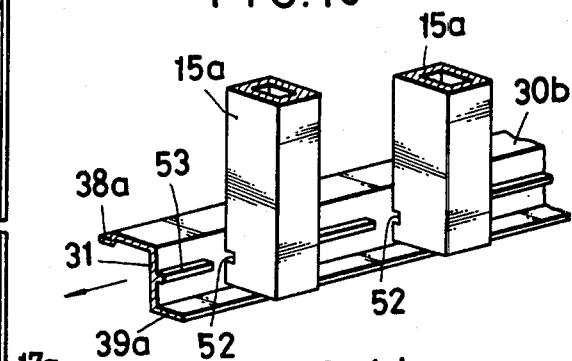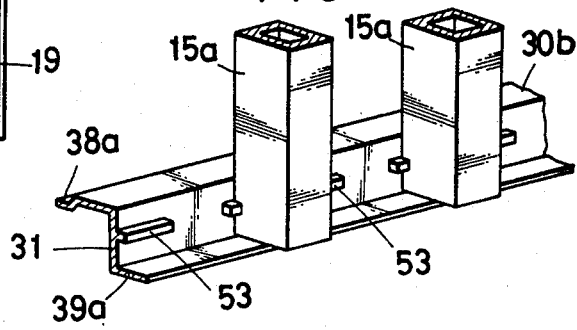

PREFABRICATED BALUSTRADE WITH MEANS FOR CONNECTION OF BALUSTERS TO A RAIL

BACKGROUND OF THE INVENTION

This invention relates generally to balustrades, and in particular to a balustrade wherein a series of balusters are connected to a top rail or to both top and bottom rails at longitudinal spacings. The invention is more specifically directed to a prefabricated balustrade wherein the balusters and the rail or rails are both provided in standardized form, such that the balusters can be easily and positively connected to the rail or rails without use of any assembling tools or fastening elements.

Various means have been proposed and used for connection of balusters to a top or bottom rail. According to an example of such known means, a pair of opposed connectors project downwardly from each of a series of apertures formed in a bottom surface of a top rail. These connectors are inserted into each hollow baluster to be connected to the rail, and a wedge is then driven in between the connectors for rigidly joining the baluster to the rail. This method is disadvantageous in view of the difficulties involved in the production of the rail with its connectors and in the assemblage of the complete balustrade. Moreover, since the balusters are subject to constant internal pressure from the driven-in wedges, cracks or fissures tend to be produced therein during the expected lifetime of the balustrade.

Another method is known in which an end portion of each hollow baluster is cut off, and the opposed ends of the remaining baluster proper and the severed end portion are held in abutment against the surrounding edge portion of an aperture formed in the top plate of a bottom rail from the opposite sides thereof. A headed pin is then driven into and through the severed baluster end portion so as to project through the aperture into the baluster proper. This method also has a drawback in connection with the extra time and labor required for cutting off the end portion of each baluster. The possible formation of cracks or fissures in the balusters with the lapse of time is a problem in common with the precedingly described method.

According to still another example of the prior art means, a hollow, metal-made cylinder is fitted over one end of each baluster, and this cylinder is inserted into and through an aperture formed in the top plate of a bottom rail. Mechanical compressing pressure is then exerted upon the cylinder by means of a suitable tool to form bellows-like pleats therein, thereby causing the cylinder to engage the top plate of the bottom rail between the pleats and also to tightly embrace the end portion of the baluster that has been fitted therein. However, the application of pressure to the cylinder from the opposite sides of the bottom rail, in a manner well calculated to produce the anticipated results, is a highly troublesome and time-consuming operation. It is also a disadvantage of this known method than the balusters cannot necessarily be connected to the rail with a desired degree of firmness. The balustrade thus assembled, moveover, is unappealing to the eye because parts of the pleated cylinders remain exposed upon the bottom rail.

SUMMARY OF THE INVENTION

It is a primary object of this invention to provide a balustrade wherein a series of balusters are easily and positively connectable to top and/or bottom railing, in such a manner that the listed disadvantages of the prior art are overcome in a highly efficient and practical fashion.

Another object of the invention is to provide a balustrade which is prefabricated in the form of several standardized, interengageable parts, such that the balustrade can be assembled without use of tools or of fastening elements such as bolts, screws and the like.

A further object of the invention is to provide a balustrade wherein the balusters are connected to the rail or rails in an aesthetically appealing manner.

A still further object of the invention is to provide a balustrade which will develop no cracks or fissures throughout its life expectation.

The concepts of this invention are equally applicable to connection of balusters to a top or bottom rail only or to both top and bottom rails. Summarized in its broadest aspects, therefore, the invention contemplates the provision of a balustrade comprising a series of balusters and a rail to which the balusters are to be connected at longitudinal spacings each at one end thereof. The rail includes a baluster mounting plate which is apertured along one of the longitudinal edges thereof. The baluster mounting plate also has a series of longitudinally spaced recesses which are open to the aperture and which are so shaped and sized as to snugly receive the end portions of the respective balusters therein, either directly or through the aperture. A filler plate is provided separately for inconspicuously closing the aperture. As disclosed in several forms of construction in the succeeding embodiments of the invention, means are provided for locking the balusters in position in the respective recesses of the rail, in a manner precluding the possibility of their detachment or displacement in any possible direction.

The features which are believed to be novel an characteristic of this invention are set forth in particular in the appended claims. The invention itself, however, both as to its organization and mode of assemblage, together with the further objects and advantages thereof, will become more apparent and understandable as the description proceeds, with reference had to the accompanying drawings wherein like reference characters denote corresponding parts of the several views.

BRIEF DESCRIPTION OF THE DRAWINGS

FIG. 8 is an enlarged sectional view taken along the plane of line VIII — VIII in FIG. 7;

FIG. 9 is a fragmentary, partly broken away perspective view illustrating in detail a series of balusters as actually connected to a bottom rail in the balustrade shown in FIG. 7; and FIGS. 10 and 11 are fragmentary perspective views explanatory of the mode of connection of the balusters to the bottom rail in the balustrade shown in FIG. 7.

DESCRIPTION OF THE PREFERRED EMBODIMENTS

Figure 1:
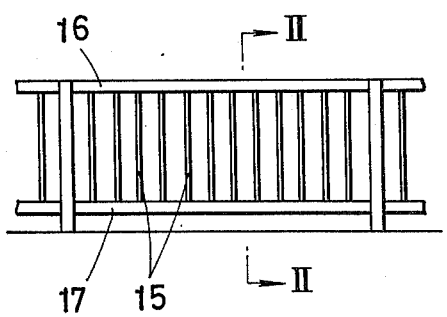
FIG. 1 is a side elevational view of a balustrade representing one of the specific adaptations of this invention.
Figure 2:
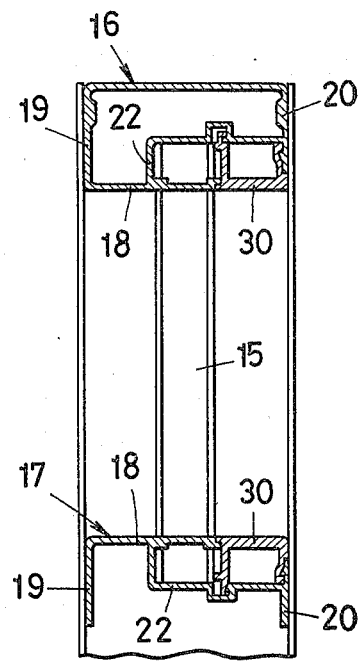
FIG. 2 is an enlarged sectional view taken along the plane of line II — II in FIG. 1.
Figure 7:
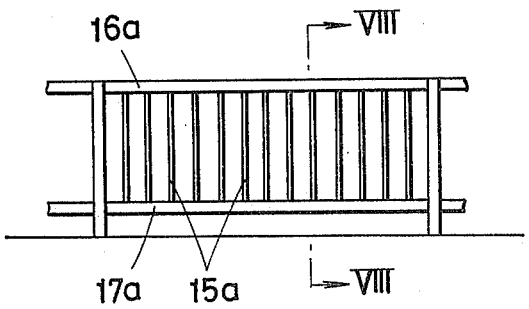
FIG. 7 is a view similar to FIG. 1 but representing another specific adaptation of the invention.

The invention will now be described more specifically as adapted by way of example for a balustrade which, as illustrated in FIG. 1, comprises a series of balusters 15, a top rail 16, and a bottom rail 17. All these constituent members of the balustrade may be made of suitable structural metal. The balusters 15 are connected to the top and bottom rails 16 and 17 by identical means, and the top and bottom rails are of substantially identical construction as far as the purposes of this invention are concerned. Therefore, in the succeeding description of the first preferred embodiment of the invention with reference to FIGS. 2 to 5, inclusive, only the bottom rail 17 will be explained in conjunction with the balusters 15, it being understood that the same description is substantially applicable to the top rail 16 as well. The same reference characters are used in FIG. 2 to denote corresponding parts of the top and bottom rails 16 and 17.

Figure 3:
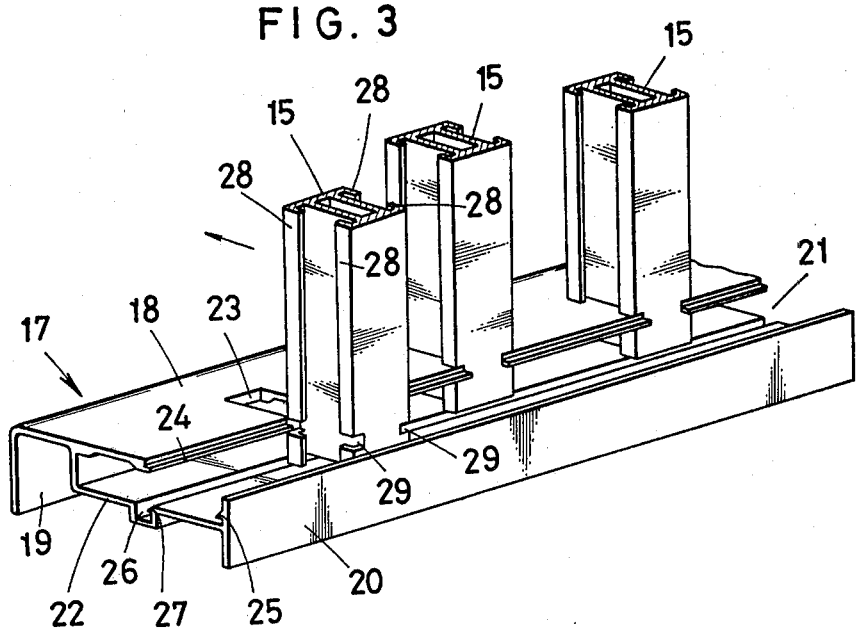
FIGS. 3 to 5, inclusive, are fragmentary perspective views sequentially illustrating the steps of connection of balusters to a bottom rail in the balustrade shown in FIG. 1.

As illustrated in FIGS. 2 to 5, inclusive, the bottom rail 17 comprises a horizontal baluster mounting plate 18 and a pair of vertical side plates 19 and 20. The mounting plate 18 is longitudinally apertured at 21 along the side plate 20, the aperture 21 having a sufficient width to permit each baluster 15 to pass vertically therethrough as seen in FIG. 3. The mounting plate 18 is joined directly to the side plate 19 and is further integrally united with the side plate 20 via a connector plate 22 of substantially L-shaped cross section arranged internally of the bottom rail 17.

A plurality of recesses 23 for snugly receiving the respective balusters 15 therein are formed in the mounting plate 18 at uniform longitudinal spacings so as to be open to the aperture 21. The longitudinal edge of the mounting plate 18 defining the aperture 21 has a step 24. A rib or ridge 25 of triangular cross section is formed longitudinally on the internal surface of the side plate 20. The connector plate 22 has a channel 26 extending longitudinally in the internal or upper surface of its horizontal portion, and another rib or ridge 27 of triangular cross section is formed longitudinally on one of the opposed side walls of the channel 26.

The balusters 15 to be connected to the bottom rail 17 are hollow and generally rectangular in cross sectional shape, with a size to fit neatly in the respective recesses 23 of the mounting plate 18. Pairs of L-shaped flanges 28 project from the opposite faces, respectively, of each baluster 15 in the longitudinal direction of the balustrade. Formed in the respective flanges 28 adjacent the bottom end of each baluster are horizontally or transversely aligned indentations 29 which will engage the mounting plate edges defining each recess 23 when the baluster is introduced horizontally therein from the aperture 21, with the result that the balusters are undetachably locked in the respective recesses. With all the balusters thus placed in the respective recesses of the mounting plate as illustrated in FIG. 3, a filler plate 30 best shown in FIG. 4 is to be fitted in the aperture 21 to close the same and is to be retained therein by means hereinafter to be described.

Figure 4:
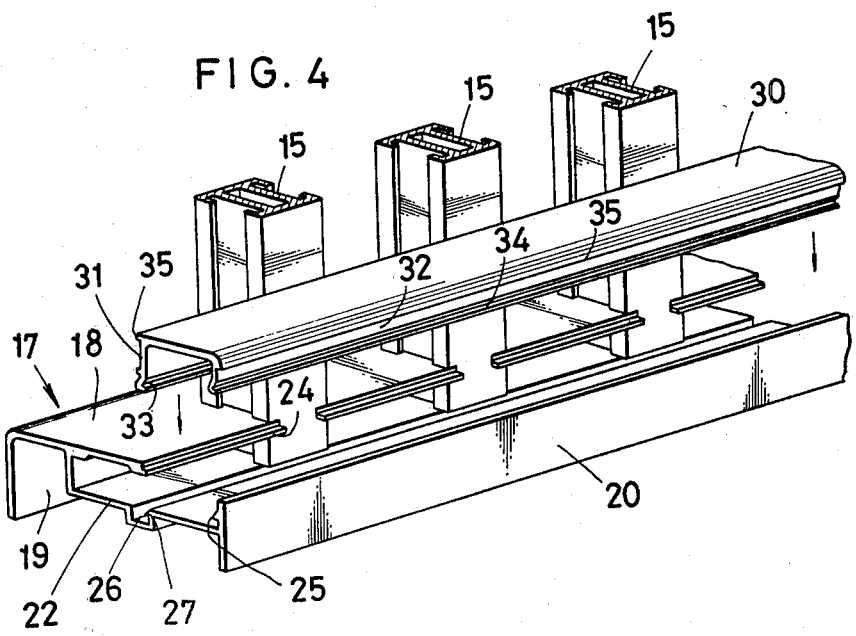
Figure 5:
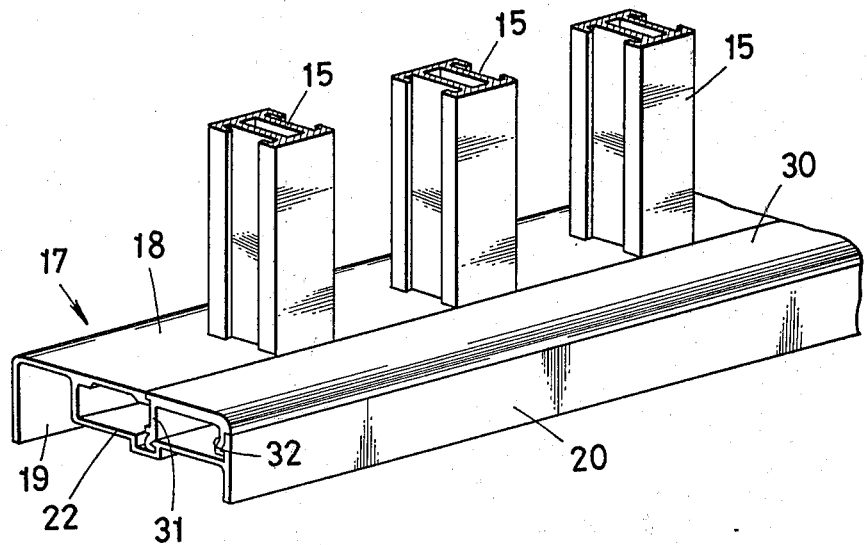

As will be seen from FIG. 4 in particular, the filler plate 30 is of approximately the same width and length as the aperture 21 and has a pair of legs 31 and 32 extending right angularly or downwardly from the longitudinal edges thereof. The filler plate leg 31 has a groove 33 of V-shaped cross section formed internally along its bottom edge, and the other filler plate leg 32 also has a V-shaped groove 34 formed externally along its bottom edge. The filler plate 30 further includes a pair of overhanging shoulders or rims 35 formed along the longitudinal edges thereof.

Thus, after the balusters 15 have all been guided horizontally into the respective recesses 23 of the mounting plate 18 from the aperture 21 as above stated, the filler plate 30 is pressed downwardly, with its legs 31 and 32 foremost, into the aperture 21 as illustrated in FIG. 4. Upon complete closure of the aperture by the filler plate, the shoulders 35 of the latter become seated against the step 24 of the mounting plate 18 and the top edge of the side plate 20, respectively, as clearly seen in FIG. 5. Similtaneously, the grooves 33 and 34 of the filler plate legs 31 and 32 engage the respective ribs 27 and 25 of the bottom rail. The filler plate 30 is thus restrained from easy detachment out of the aperture 21 and itself functions to confine the lower and portions of the balusters 15 within the respective recesses 23. It will be noted from FIGS. 2 and 5 that the external surface of the filler plate thus fitted in the aperture is flush with the external surface of the mounting plate 18.

Figure 6:
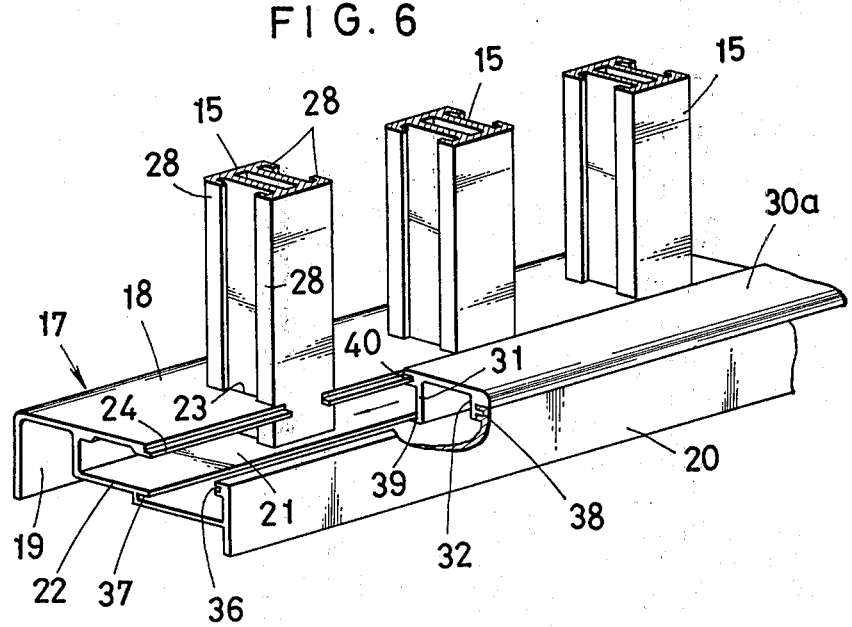
FIG. 6 is a view similar to FIG. 3, 4 or 5 but showing another preferred embodiment of the invention, in which the bottom rail is shown partly broken away to reveal the internal details.

FIG. 6 illustrates a slight modification of the preceding embodiment of the invention, in which the filler plate 30a is adapted to slide horizontally or longitudinally into the aperture 21 of the mounting plate 18, as compared with the snap-on type of filler plate 30 in the preceding embodiment. The side plate 20 of the bottom rail 17 has an inwardly open groove 36 running along the top edge thereof, and the connector plate 22 has a groove 37 running longitudinally in its horizontal portion, the groove 37 opening toward the side plate 20. Correspondingly, the filler plate 30a has a rib 38 formed longitudinally on the external surface of its leg 32, and another rib or flange 39 formed longitudinally on the external surface of the other leg 31 along the bottom edge thereof. The filler plate 30a is further formed with a groove 40 along one of the longitudinal edges thereof, which groove is open toward the step 24 of the mounting plate 18.

For closing the aperture 21 by the filler plate 30a, the latter is slid longitudinally into the former. In this event, the rib 38 of the filler plate leg 32 is placed in the groove 36 of the side plate 20, the rib 39 of the filler plate leg 31 in the groove 37 of the connector plate 22, and the step 24 of the mounting plate 18 in the groove 40 of the filler plate 30a. By thus closing the aperture 21, the lower end portions of the balusters 15 can be undetachably retained in the respective recesses 23 of the mounting plate 18 as in the preceding embodiment. The external surface of the filler plate 30a is also held flush with the external surface of the mounting plate 18.

It is to be understood that the specific forms of the filler plate 30 or 30a shown in the drawings are purely by way of example. The invention should be construed to be inclusive of various other forms of the filler plate if they are designed to close the aperture 21 in an essentially identical fashion. In all such various possible forms of the filler plate, however, its external surface should preferably be disposed in the plane of the mounting plate external surface, principally from the standpoint of aesthetics. It is also to be clearly noted that the purposes of this invention can be substantially accomplished if the balusters 15 are dispensed with their L-shaped flanges 28.

According to the two preferred embodiments of the invention hereinbefore described, the balusters 15 are prevented from detachment or displacement in their longitudinal direction and in the longitudinal direction of the balustrade as the lower end portions of the balusters are neatly received in the respective recesses 23, with the surrounding edges of the mounting plate engaged in the horizontally aligned indentations 29 of the balusters. Furthermore, the balusters are prevented from detachment or displacement in the transverse direction of the balustrade as the filler plate 30 is fitted and retained in the aperture 21. As the upper end portions of the balusters are assumed to be connected to the top rail 16 by means identical with those shown in FIGS. 3 to 5, inclusive, or in FIG. 6, the balusters can be securely installed between the top and bottom rails 16 and 17 in their preassigned longitudinally spaced positions.

FIGS. 7 to 11, inclusive, illustrate a further preferred embodiment of the invention in which a series of balusters 15a are also connected to top and bottom rails 16a and 17a by identical means, and in which the top and bottom rails are substantially identical construction as far as the purposes of this invention are concerned. Therefore, in the succeeding description of this third embodiment, too, only the bottom rail 17a will be considered in conjunction with the balusters 15a, with the understanding that the same description is substantially applicable to the top rail 16a as well. The same reference characters are used in FIG. 8 to designate corresponding parts of the top and bottom rails.

As will be seen from FIGS. 8 and 9, the bottom rail 17a is of generally rectangular cross section, comprising a horizontal baluster mounting plate 18, a pair of vertical side plates 19 and 20, and a horizontal bottom plate 50. As in the preceding embodiments, a longitudinal aperture 21 is formed in the mounting plate 18 along the side plate 20, and the mounting plate is integrally united with this side plate 20 via a connector plate 22 of substantially L-shaped cross section arranged internally of the bottom rail 17a.

A series of recesses 23, so shaped and sized as to snugly receive the respective balusters 15a are formed in the mounting plate 18 at constant longitudinal spacings so as to be open to the aperture 21. The side plate 20 has an inwardly open groove 36 extending along the top edge thereof, and the connector plate 22 has a groove 37a of L-shaped cross section extending longitudinally on its horizontal portion.

As seen in FIG. 9, the vertical portion of the connector plate 22 has a series of horizontally aligned ledges 51 projecting toward the side plate 20, the ledges being spaced apart from each other only to such an extent as to closely engage the respective balusters 15a therebetween as in the drawing. These spacings between the ledges 51 are arranged in vertically registered relationship to the respective recesses 23 of the mounting plate 18.

Each of the balusters 15a to be connected to the bottom rail 17a of the foregoing configuration is of rectangular cross section and has a horizontal groove 52 formed in one of its faces adjacent the bottom end thereof. These balusters are to be inserted into the respective recesses 23 of the mounting plate 18, with their horizontally grooved (52) faces directed toward the aperture 21, and are to be engaged in the spacings between the ledges 51 on the connector plate 22. With all the balusters thus placed in the respective recesses as shown in FIG. 9, a filler plate 30b of sliding type (only slightly different in configuration from the sliding filler plate 30a shown in FIG. 6) is to be mounted in position in the aperture 21 thereby to establish the positive connection of the balusters to the bottom rail 17a.

The filler plate 30b has approximately the same width and length as the aperture 21. A rib or flange 38a adapted to slidably fit in the groove 36 of the side plate 20 is formed along one of the longitudinal edges of the filler plate 30b. A leg 31 extends downwardly from the other longitudinal edge of the filler plate 30b and terminates in a flange 39a adapted to slidably fit in the L-shaped groove 37a of the connector plate 22.

The leg 31 of the filler plate 30b has a series of horizontally aligned ledges 53 projecting toward the vertical portion of the connector plate 22. Like the first recited ledges 51 on the connector plate 22, these ledges 53 are also spaced apart from each other to such an extent as to permit the respective balusters 15a to pass vertically therebetween. Furthermore, the ledges 53 are staggered with respect to the ledges 52, in such a way that the spacings between the former will face the spacings between the latter when the filler plate 30b reaches a predetermined position before being slid completely into position in the aperture 21.

For connection of the balusters 15a to the bottom rail 17a, the filler plate 30b is first slid into the aperture 21, with the flanges 38a and 39a of the filler plate received in the groove 36 of the side plate 20 and in the groove 37a of the connector plate 22, respectively. When the filler plate 30b reaches the aforesaid predetermined position before being slid completely into the aperture 21, where the spacings between the ledges 53 are held in exactly registered relationship to the spacings between the ledges 51 and therefore to the recesses 23 of the mounting plate 18, the lower end portions of the balusters 15a are inserted into the respective recesses 23. It will be seen from a consideration of FIG. 10 that the lower end portions of the balusters which have been thus inserted into the recesses are, on the one hand, closely engaged in the spacings between the ledges 51 on the connector plate 22 and, on the other hand, disposed in the spacings between the ledges 53 on the filler plate 30b. This filler plate is then slid completely into position in the aperture 21, as indicated by the arrow in FIG. 10, with the result that the ledges 53 are now neatly received in the respective horizontal grooves 52 of the balusters 15a as seen in FIG. 11. All the balusters are thus simultaneously locked in position in the recesses 23. The connection of the balusters to the bottom rail 17a is now completed, and it is understood that the balusters can likewise be connected to the top rail 16a.

It should be noted in connection with this third embodiment of the invention that the ledges 51 on the vertical portion of the connector plate are intended to engage therebetween the end portions of the balusters 15a that have been inserted into the recesses 23 and hence to positively hold the same against movement in the longitudinal direction of the balustrade. The ledges 51, therefore, may not necessarily be formed on the vertical portion of the connector plate 22 as in the illustrated embodiment but may be formed, for example, on the horizontal portion of the connector plate or on the internal surface of the mounting plate 18. It is also possible that these ledges be eliminated altogether, provided that the mounting plate is of such great thickness that the balusters can be stably supported by the mounting plate edges defining the recesses 23.

According to the third embodiment of the invention hereinbefore described, the balusters 15a are restrained from detachment or displacement either in the longitudinal or transverse direction of the balustrade as they are inserted into the respective recesses 23 in the mounting plate 18 and are engaged in the spacings between the ledges 51 on the connector plate 22 while the filler plate 30b is held in the predetermined position in the aperture 21. The balusters are further restrained from detachment or displacement in their longitudinal direction as the ledges 53 on the leg 31 of the filler plate 30b are engaged in the respective grooves 52 of the balusters upon complete insertion of the filler plate into the aperture 21. Since the upper end portions of the balusters 15a are joined to the top rail 16a by identical means as above stated, it will be seen that the balusters can be easily and positively installed in their predetermined spaced apart positions between the top and bottom rails.

Although the balustrade according to this invention has been shown and described hereinbefore in very specific aspects thereof, it is to be clearly understood that the invention itself is not to be restricted by the exact showing of the drawings or the description thereof. For example, as previously set forth, the concepts of the invention are applicable to connection of balusters either to a top or bottom rail only or to both top and bottom rails. It is therefore appropriate that the invention be construed broadly and in a manner consistent with the fair meaning or proper scope of the invention as sought to be defined by the following claims.

What is claimed is:

1. A balustrade comprising, in combination, a series of balusters, a rail to which said balusters are to be connected at longitudinal spacings each at one end thereof, said rail including a baluster mounting plate structure having a longitudinally extending aperture defined by a pair of spaced-apart longitudinal edges, said baluster mounting plate structure also having a series of longitudinally spaced transversely extending recesses which are open to said aperture, said recesses each having a shape to receive the end portions of said balusters respectively, a filler plate disposed to engage said spaced-apart edges for closing said aperture, and means including engageable male and female parts for locking said balusters in position in said recesses respectively.

2. A balustrade as set forth in claim 1, wherein said filler plate has parts accommodating a snap fitting thereof with said edges.

3. A balustrade as set forth in claim 1, wherein said filler plate has its external surface flush with the external surface of said baluster mounting plate structure when in a closed disposition in said aperture.

4. A balustrade as set forth in claim 1, wherein siad locking means comprises a plurality of flanges formed longitudinally of each of said balusters, said flanges having transversely aligned indentations that engage the edges of said baluster mounting plate structure which define said recesses when said balusters are received respectively therein.

5. A balustrade as set forth in claim 1, wherein said filler plate is slidable longitudinally into position in said aperture.

6. A balustrade comprising, in combination, a series of balusters, a rail to which said balusters are to be connected at longitudinal spacings each at one end thereof, said rail including a pair of side plates and a baluster mounting plate, said baluster mounting plate having an aperture extending along one of said side plates and a series of longitudinally spaced transversely extending recesses which are open to said aperture, said recesses each having a shape to receive the end portions of said balusters respectively, a connector plate arranged internally of said rail to integrally connect said baluster mounting plate to said one side plate, a filler plate for closing said aperture, and means including male and female parts for locking said balusters in position in said recesses respectively.

7. A balustrade as set forth in claim 6, wherein said filler plate is slidable longitudinally into position in said aperture, and wherein said filler plate has a leg along one of the longitudinal edges thereof which slidably engages said connector plate.

8. A balustrade as set forth in claim 7, wherein said locking means comprises a series of longitudinally spaced ledges formed on said leg of said filler plate, and a groove formed transversely in each of said balusters adjacent said one end thereof, said ledges being engaged in said grooves of said balusters, respectively, when said filler plate is slid into position in said aperture.

9. A balustrade as set forth in claim 8, wherein said ledges are spaced apart from each other to such an extent as to permit the respective balusters to pass therebetween, whereby said balusters can be inserted into the respective recesses of said baluster mounting plate while said filler plate is held in a predetermined position in said aperture before being slid completely into position therein.

10. A balustrade as set forth in claim 8, wherein said locking means further comprises a series of second longitudinally spaced ledges formed internally of said rail, the spacings between said second ledges being in register with the respective recesses of said baluster mounting plate whereby said balusters are engaged in the respective spacings between said second ledges upon insertion into said recesses.

11. A balustrade as set forth in claim 10, wherein said second ledges are formed on said connector plate.

* * * * *